(12) United States Patent
Boratav et al.

(10) Patent No.: US 10,661,533 B2
(45) Date of Patent: May 26, 2020

(54) LAMINATED GLASS ARTICLES AND PROCESS FOR MAKING SAME

(71) Applicant: CORNING INCORPORATED, Corning, NY (US)

(72) Inventors: Olus Naili Boratav, Ithaca, NY (US); Ming-Jun Li, Horseheads, NY (US); Piotr Janusz Wesolowski, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 325 days.

(21) Appl. No.: 15/036,312

(22) PCT Filed: Nov. 10, 2014

(86) PCT No.: PCT/US2014/064742
§ 371 (c)(1),
(2) Date: May 12, 2016

(87) PCT Pub. No.: WO2015/073350
PCT Pub. Date: May 21, 2015

(65) Prior Publication Data
US 2016/0311198 A1    Oct. 27, 2016

Related U.S. Application Data

(60) Provisional application No. 61/903,611, filed on Nov. 13, 2013.

(51) Int. Cl.
*B32B 17/06* (2006.01)
*F21V 8/00* (2006.01)
*C03B 17/06* (2006.01)

(52) U.S. Cl.
CPC ............ *B32B 17/06* (2013.01); *C03B 17/064* (2013.01); *G02B 6/0056* (2013.01);
(Continued)

(58) Field of Classification Search
USPC .......................................................... 362/19
See application file for complete search history.

(56) References Cited

U.S. PATENT DOCUMENTS

| | | |
|---|---|---|
| 3,338,696 A | 8/1967 | Dockerty et al. |
| 3,737,294 A | 6/1973 | Dumbaugh, Jr. et al. |

(Continued)

FOREIGN PATENT DOCUMENTS

| | | |
|---|---|---|
| CN | 102815859 A | 12/2012 |
| EP | 0866330 A2 | 9/1998 |

(Continued)

OTHER PUBLICATIONS

The International Search Report and Written Opinion, dated Mar. 11, 2015, pp. 1-9, International Application No. PCT/US2014/064742, International filed Nov. 10, 2014, European Patent Office, The Netherlands.

(Continued)

*Primary Examiner* — Michael G Lee
*Assistant Examiner* — David Tardif
(74) *Attorney, Agent, or Firm* — Michael A. Hood; Svetlana Z. Short

(57) ABSTRACT

A laminated glass article includes at least a first layer, a second layer in direct contact with the first layer, and an optical property difference between the first layer and the second layer. The optical property difference includes at least one of: (a) a transmission profile difference between a transmission profile of the first and second layers in a wavelength range from 200 nm to 2500 nm; or (b) a light-polarizing difference, whereby the second layer is light-polarizing with respect to electromagnetic irradiation in the wavelength range from 200 nm to 2500 nm; or (c) a refractive index difference between refractive indices of the first and second layers of at least 0.005, wherein one layer (Continued)

includes a base glass composition and the other layer includes the base glass composition and a dopant in an amount sufficient to cause the refractive index difference.

18 Claims, 7 Drawing Sheets

(52) U.S. Cl.
CPC ...... *G02B 6/0065* (2013.01); *B32B 2307/418* (2013.01); *B32B 2457/202* (2013.01)

(56) References Cited

U.S. PATENT DOCUMENTS

| | | | |
|---|---|---|---|
| 3,746,526 A | 7/1973 | Giffon | |
| 3,849,097 A | 11/1974 | Giffen et al. | |
| 3,931,438 A | 1/1976 | Beall et al. | |
| 4,102,664 A | 7/1978 | Dumbaugh, Jr. | |
| 4,204,027 A | 5/1980 | Simon | |
| 4,214,886 A | 7/1980 | Shay et al. | |
| 4,425,146 A | 1/1984 | Izawa et al. | |
| 4,486,213 A | 12/1984 | Lentz et al. | |
| 5,342,426 A | 8/1994 | Dumbaugh, Jr. | |
| 5,559,060 A | 9/1996 | Dumbaugh, Jr. et al. | |
| 5,864,427 A | 1/1999 | Fukano et al. | |
| 5,982,540 A * | 11/1999 | Koike | G02B 6/0056 349/62 |
| 6,393,868 B1 | 5/2002 | Krauss et al. | |
| 7,201,965 B2 | 4/2007 | Gulati et al. | |
| 7,514,149 B2 | 4/2009 | Bocko et al. | |
| 8,007,913 B2 | 8/2011 | Coppola et al. | |
| 8,713,967 B2 | 5/2014 | Danielson et al. | |
| 9,393,760 B2 | 7/2016 | He et al. | |
| 2002/0070352 A1 | 6/2002 | Allan et al. | |
| 2004/0003627 A1 | 1/2004 | Hashima et al. | |
| 2006/0127679 A1 | 6/2006 | Gulati et al. | |
| 2006/0176429 A1 | 8/2006 | Watchi et al. | |
| 2007/0201234 A1 | 8/2007 | Ottermann | |
| 2008/0094528 A1* | 4/2008 | Robinson | G02B 5/285 349/1 |
| 2010/0027293 A1* | 2/2010 | Li | G02B 6/002 362/619 |
| 2011/0017287 A1* | 1/2011 | Borrelli | H01L 31/02168 136/256 |
| 2011/0318555 A1 | 12/2011 | Bookbinder et al. | |
| 2012/0200929 A1* | 8/2012 | Lu | G02B 5/0221 359/599 |
| 2012/0230007 A1* | 9/2012 | Kawakami | F21V 9/14 362/19 |
| 2012/0234050 A1 | 9/2012 | Booko et al. | |
| 2012/0268687 A1* | 10/2012 | Kaida | B29D 11/00663 349/61 |
| 2013/0119356 A1 | 5/2013 | Beall et al. | |
| 2014/0043786 A1* | 2/2014 | Cho | G02B 5/3025 362/19 |
| 2016/0311198 A1* | 10/2016 | Boratav | B32B 17/06 |

FOREIGN PATENT DOCUMENTS

| | | |
|---|---|---|
| EP | 1818965 A2 | 8/2007 |
| JP | 8248227 A | 9/1996 |
| JP | 8511130 A | 11/1996 |
| JP | 09043429 A | 2/1997 |
| JP | 2002144481 A | 5/2002 |
| JP | 2003227922 A | 8/2003 |
| JP | 2007335731 A | 12/2007 |
| JP | 2008502951 A | 1/2008 |
| KR | 2012078305 A | 7/2012 |
| KR | 2013010599 A | 1/2013 |
| TW | 200911759 A | 3/2009 |
| WO | 2010084922 A1 | 7/2010 |
| WO | 2013130668 A1 | 9/2013 |

OTHER PUBLICATIONS

3M Optical Systems: Where Brilliant Ideas Come to Light, dated 2016, pp. 1, 3M Optical Systems, available at http://solutions.3m.com/wps/portal/3M/en_US/Vikuiti1/BrandProducts/main/marketsweserve/displayaftermarket/specialtydisplay.

English Translation of CN201480062317.6 Office Action dated Jun. 9, 2017; 15 Pages; Chinese Patent Office.

English Translation of CN201480062317.6 Second Office Action dated Feb. 14, 2018, China Patent Office; 14 Pgs.

English Translation of JP2016529455 Office Action dated Aug. 21, 2018; 23 Pages; Japanese Patent Office.

TW103137890 Search Report dated Jun. 21, 2018; 1 Page; Taiwan Patent Office.

Chinese Patent Appliaction No. 201480062317.6; English Translation of the Fifth Office Action dated Feb. 28, 2020; China Patent Office; 6 Pgs.

* cited by examiner

LAMINATED GLASS ARTICLES AND PROCESS FOR MAKING SAME

This application claims the benefit of priority under 35 U.S.C. § 371 of International Application No. PCT/US2014/ 064742, filed on Nov. 10, 2014, which claims the benefit of priority under 35 U.S.C. § 119 of U.S. Provisional Application No. 61/903,611, filed on Nov. 13, 2013, the content of each of which is relied upon and incorporated herein by reference in its entirety.

BACKGROUND

The present disclosure relates to laminated glass articles and a process for making the same. In particular embodiments, the present disclosure relates to laminated glass articles having pristine main surfaces and differing optical properties in differing layers and fusion down-draw processes for making the same. The processes described herein may be useful, for example, in making laminated glass sheets for various display applications.

SUMMARY

In one embodiment, a laminated glass article includes at least a first layer, a second layer in direct contact with the first layer, and an optical property difference between the first layer and the second layer. The optical property difference includes at least one of: (a) a transmission profile difference between a transmission profile of the first and second layers in a wavelength range from 200 nm to 2500 nm; or (b) a light-polarizing difference, whereby the second layer is light-polarizing with respect to electromagnetic irradiation in the wavelength range from 200 nm to 2500 nm; or (c) a refractive index difference between refractive indices of the first and second layers of at least 0.005, wherein one layer includes a base glass composition and the other layer includes the base glass composition and a dopant in an amount sufficient to cause the refractive index difference.

In another embodiment, an optical device comprises a laminated glass article. A plurality of semiconductor devices is disposed on at least one major external surface of the laminated glass article.

In another embodiment, a process for making a laminated glass article comprises a down-draw process.

In another embodiment, an overflow distributor apparatus comprises a distributor portion and a forming portion extending from the distributor portion. The distributor portion comprises a trough divided into a first trough portion and a second trough portion by a partitioning wall. Each of the first trough portion and the second trough portion comprises a top edge adjacent to a respective one of a first sidewall of the distributor portion and a second sidewall of the distributor portion opposite the first sidewall. The forming portion comprises a first sidewall adjacent to the first sidewall of the distributor portion and a second sidewall opposite the first sidewall of the forming portion and adjacent to the second sidewall of the distributor portion. The first and second sidewalls of the forming portion converge with one another at a draw line.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiment(s), and together with the description serve to explain principles and operation of the various embodiments.

DETAILED DESCRIPTION

Figure 1:
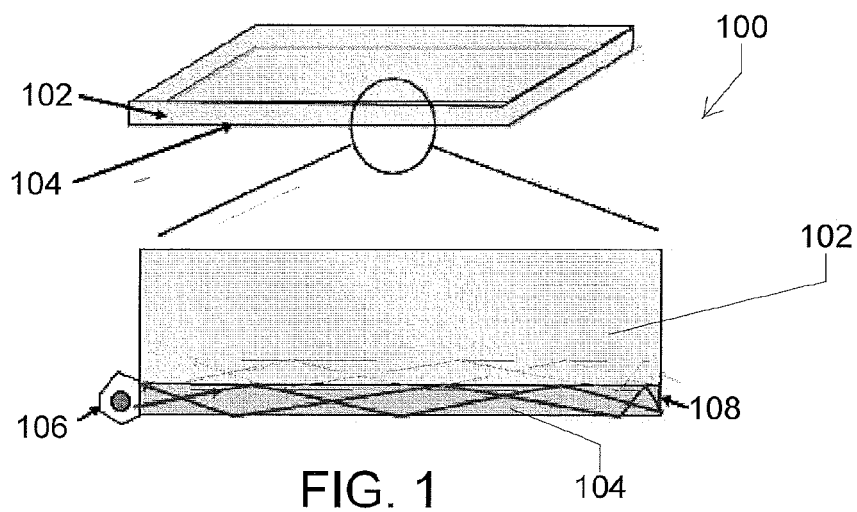
FIG. 1 is a cross sectional view of one exemplary embodiment of a laminated glass article including a substrate layer and a light guide/light diffuser layer.

Reference will now be made in detail to exemplary embodiments which are illustrated in the accompanying drawings. Whenever possible, the same reference numerals will be used throughout the drawings to refer to the same or like parts. The components in the drawings are not necessarily to scale, emphasis instead being placed upon illustrating the principles of the exemplary embodiments.

FIG. 1 shows one exemplary embodiment of a laminated glass article or glass composite 100 configured as a substrate (e.g., an active-matrix liquid crystal display (AMLCD) substrate) and light guide/light diffuser. The laminated glass article 100 comprises a substrate layer (A-layer) 102 and a light guide/light diffuser layer (B-layer) 104. In this manner, the laminated glass article 100 can exhibit dual functionality (e.g., a first functionality provided by the substrate layer 102 and a second functionality provided by the light guide/light diffuser layer 104). The substrate layer 102 has an index of refraction $n_1$, and the light guide/light diffuser layer has an index of refraction $n_2$, which can be different than the index of refraction $n_1$. In some embodiments, the index of refraction $n_1$ differs from the index of refraction $n_2$ by at least about 0.005, at least about 0.01, at least about 0.02, at least about 0.05, at least about 0.1, at least about 0.2, at least about 0.3, or at least about 0.4. In some embodiments, the index of refraction $n_1$ is greater than the index of refraction $n_2$. In other embodiments, the index of refraction $n_1$ is less than the index of refraction $n_2$.

Light can be introduced into the light guide/light diffuser layer 104 by a light source 106. In some embodiments, the light source 106 is positioned at an edge of the laminated glass article 100. In this manner, the light source 106 provides edge illumination to the light guide/light diffuser layer 104. A mirrorized surface 108 is disposed at an edge of the light guide/light diffuser layer 104 (e.g., opposite the light source 106). Light can be reflected by the mirrorized surface into the light guide/light diffuser layer 104. In some embodiments, two light sources are positioned at two edges (e.g., opposing edges) of the laminated glass article. In other embodiments, any number of light sources can be positioned at any number of edges of the laminated glass article. The use of multiple light sources can provide more uniform illumination. In some embodiments, the entry angles of the light and the mismatch between $n_1$ and $n_2$ satisfies the total internal reflection (TIR) principle as defined by Fresnel's Law.

By providing conditions to satisfy TIR, uniform light diffusion action can be delivered across substantially the entire surface of the laminated glass article 100. In some embodiments, such uniform light diffusion is provided by microcorrugation or internally created Bragg gratings. For example, in some of such embodiments, the B-layer comprises a diffusing feature such as a microcorrugation or a Bragg grating. Such gratings can be created, for example, by precision UV glass hardening or using laser inscription techniques (e.g., using a single photon, a two-photon, or a multiplex photon absorption process). In some embodiments, uniform light diffusion is achieved by providing scattering centers distributed in the B-layer. For example, in some of such embodiments, the scattering centers are inclusions (e.g., glass particles) with a refractive index different than that of the guiding layer (e.g., a refractive index different than that of the bulk glass composition of the guiding layer), air bubbles, or scattering features (e.g., formed by laser inscription). In some embodiments, the B-layer (e.g., the waveguide layer) comprises inclusions having a dimension that is smaller than the wavelength of the guided light in the B-layer. Such inclusions can aid in effectively diffusing light out of the B-layer. The inclusions can have a dimension ranging, for example, from about 3 nm to about 1 μm.

Figure 2:
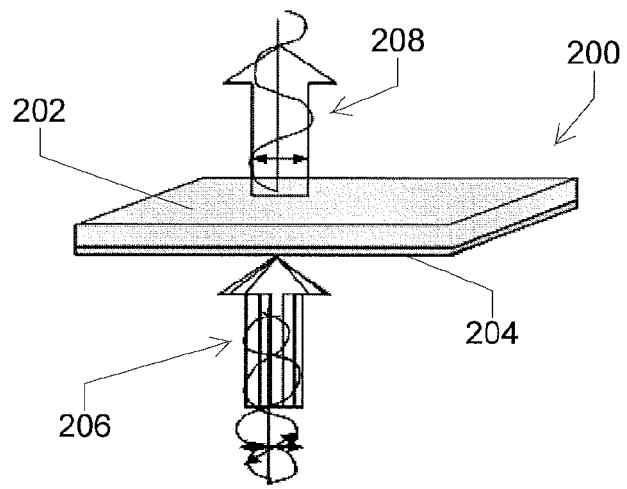
FIG. 2 is a perspective view of one exemplary embodiment of a laminated glass article including a substrate layer and a linear polarizer layer.

FIG. 2 shows one exemplary embodiment of a laminated glass article 200 configured as a substrate (e.g., an AMLCD substrate) and linear polarizer. The laminated glass article 200 comprises a substrate layer (A-layer) 202 and a linear polarizer layer (B-layer) 204. The linear polarizer layer 204 may be formed using any suitable process including, for example, drawing a glass sheet into a linear polarizer as described in U.S. Pat. No. 4,486,213, which is incorporated by reference herein in its entirety. Non-polarized light 206 is polarized as it passes through the polarizer layer 204 so that polarized light 208 is transmitted by the laminated glass article 200. In some embodiments, the substrate layer 202 is a non-light-polarizing layer.

Figure 3A:
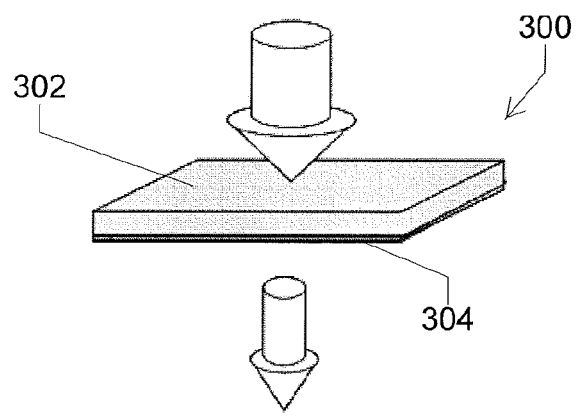
FIG. 3A is a perspective view of one exemplary embodiment of a laminated glass article configured as an optical filter.
Figure 3B:
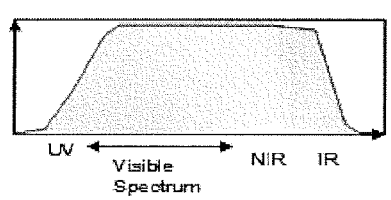
FIG. 3B is a graphical representation of transmission of light through a first layer of the laminated glass article shown in FIG. 3A as a function of wavelength.
Figure 3C:
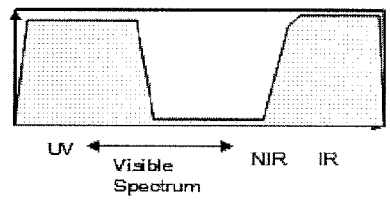
FIG. 3C is a graphical representation of transmission of light through a second layer of the laminated glass article shown in FIG. 3A as a function of wavelength.
Figure 3D:
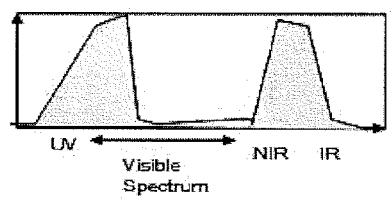
FIG. 3D is a graphical representation of transmission of light through the laminated glass article shown in FIG. 3A as a function of wavelength.

FIG. 3A shows one exemplary embodiment of a laminated glass article 300 configured as an optical filter. The laminated glass article 300 comprises a first layer (A-layer) 302 and a second layer (B-layer) 304. In some embodiments, the first layer 302 allows passage of light within a defined wavelength range while blocking passage of light outside of the defined wavelength range. For example, FIG. 3B shows the transmission of light through the first layer 302 as a function of wavelength. As shown in FIG. 3B, the first layer 302 allows passage of light in a first defined wavelength range extending from the upper end of the ultraviolet (UV) range to the infrared (IR) range, while blocking passage of light above and below the first defined wavelength range. In this manner, the first layer 302 is configured as a band-pass filter layer. The second layer 304 blocks passage of light within a defined wavelength range while allowing passage of light outside of the defined wavelength range. For example, FIG. 3C shows the transmission of light through the second layer 304 as a function of wavelength. As shown in FIG. 3C, the second layer 304 blocks passage of light within a second defined wavelength range extending from the middle of the visible range to the lower end of the near infrared (NIR) range, while allowing passage of light above and below the second defined wavelength range. In this manner, the second layer 304 is configured as a notch filter layer. FIG. 3D shows the transmission of light through the laminated glass article 300 as a function of wavelength which is a convolution of the transmission of light through each of the first layer 302 and the second layer 304.

In other embodiments, each of the first and second layers, independently, can be configured as a notch filter or a band pass filter or can allow passage of light generally without regard to wavelength. The transmission profile of each of the first and second layers can be selected to produce a laminated glass article having a desired transmission profile.

In some embodiments, a laminated glass article comprises layers having different transmission profiles. For example, in some embodiments, the laminated glass article comprises a first layer (A-layer) and a second layer (B-layer) having differing transmission profiles in a wavelength range from about 200 nm to about 2500 nm. In some embodiments, the laminated glass article comprises an outermost layer (e.g., the first layer, the second layer, or another layer) that is light-polarizing with respect to certain electromagnetic irradiation in the range of about 200 nm to about 2500 nm.

In some embodiments, an optical device comprises a laminated glass article. A plurality of semiconductor devices is disposed on at least one of the major external surfaces of the laminated glass article. In some of such embodiments, at least part of the plurality of semiconductor devices is formed by employing a step in which the laminated glass article is subjected to a temperature higher than 400° C., higher than 450° C., higher than 500° C., higher than 550° C., or higher than 600° C. In these or others of such embodiments, the interface of the two adjacent layers (e.g., the A-layer and the B-layer) is uneven such that light traveling through one layer is reflected at the interface in multiple directions. Additionally, or alternatively, in some embodiments, the functional layer (e.g., the B-layer) is an external layer having a reflective layer disposed on an external surface thereof. In this manner, an external surface of the external functional layer comprises a reflective surface. An illumination source can be coupled to the edge of at least one functional layer of the laminated glass article, such that light is allowed to travel through the functional layer. At least part of the light traveling in the functional layer can be subject to total internal reflection when reflected at the interface of its external surface and the outside medium to which it is exposed, such as air. In some embodiments, the optical device is an LCD display, a flexible display, a curved display, a photovoltaic device, an optical filter (e.g., a safety glass lens), or any other suitable optical device. In some embodiments, the optical device is subjected to an elevated temperature of at least 300° C., at least 400° C., at least 500° C., at least 600° C., or at least 700° C., during operation thereof.

Figure 4A:
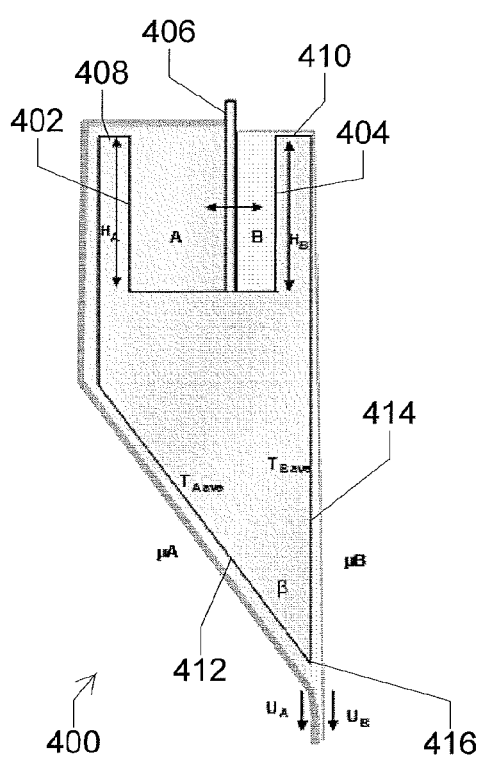
FIG. 4A is a longitudinal cross-sectional view of one exemplary embodiment of an overflow distributor that may be used to manufacture a laminated glass article.
Figure 4B:
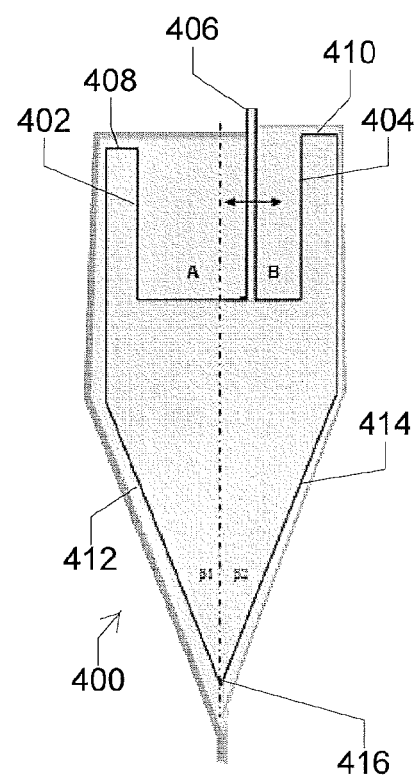
FIG. 4B is a longitudinal cross-sectional view of another exemplary embodiment of an overflow distributor that may be used to manufacture a laminated glass article.

FIGS. 4A and 4B depict longitudinal cross-sectional views of two different exemplary embodiments of overflow distributors 400, or fusion pipes, that can be used to manufacture a laminated glass article or glass composite as described herein. Each overflow distributor 400 comprises a trough divided into a first trough portion 402 and a second trough portion 404 by a partitioning wall 406. Molten glass composition A is introduced into the first trough portion 402 in a viscous state. Molten glass composition B is introduced into the second trough portion 404 in a viscous state. The glass compositions flow over top edges 408 and 410, or brims, of the respective first and second trough portions 402 and 404, down opposing sidewalls of the overflow distributor and onto converging sidewalls 412 and 414 of a forming member of the overflow distributor 400. One or both of the converging sidewalls 412 and 414 are angled relative to a vertical plane by an angle β such that the forming member has, for example, a wedge-shaped cross-section. The converging sidewalls 412 and 414 meet at a draw line 416. The flowing glass compositions A and B meet near the draw line 416 and are fused to one another to form a laminated glass ribbon. The process of forming the laminated glass ribbon using an overflow distributor as described herein is a downdraw or fusion-draw process. The fused A-layer and B-layer are directly adjacent to and/or in direct contact with one another. In this manner, the composite is free of any bonding material (e.g., an adhesive, a coating layer, a frit, or any other material added or configured to adhere the layers to one another) disposed between the A-layer and the B-layer.

In some embodiments, before, during, and/or after the drawing process, one layer of the glass composite is essentially free of contact with any guiding mechanism or drawing mechanism (e.g., rollers). Additionally, or alternatively, during the drawing process, the glass of one layer only partially covers the surface of an adjacent layer, leaving a portion of the surface of the adjacent layer uncovered by the one layer. In some embodiments, the geometry of the overflow distributor depends on the properties of the different glass compositions and/or the desired thickness ratio of the thickness of the A-layer to the thickness of the B-layer $h_A/h_B$. For example, in some of such embodiments, a ratio of the volume of the first trough portion 402 $V_A$ to the volume of the second trough portion 404 $V_B$ depends on the desired thickness ratio $h_A/h_B$.

FIG. 4A depicts one exemplary embodiment in which the angle $\beta_2=0$, thus providing a maximum flow velocity for stream B $v_B$. In some embodiments, to promote equality of the flow velocities for stream A $v_A$ and stream B $v_B$, the angle $\beta_1$ is negative as shown in FIG. 4B. In some embodiments, the angle $\beta_1$ is between about −25° and about 25°. In some embodiments, the angle $\beta_2$ is between about −25° and about 25°.

Figure 5:
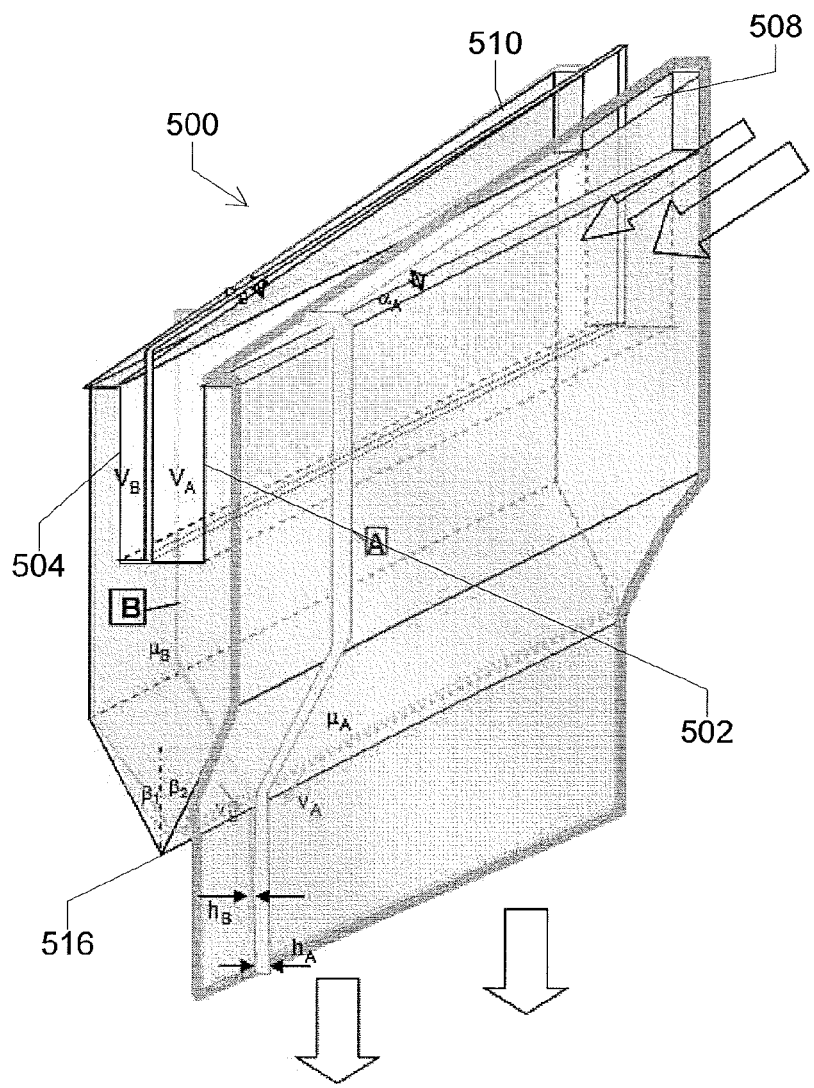
FIG. 5 is a 3-D view of one exemplary embodiment of an overflow distributor.

FIG. 5 shows a 3-D view of one exemplary embodiment of an overflow distributor 500. The overflow distributor 500 is configured generally as described above with reference to the overflow distributor 400, with the additional features and/or differences described below. In addition to the pipe cross-sectional geometries described above, other variables include, for example, the slope angles $\alpha_A$ and $\alpha_B$ between a horizontal plane and the brims 508 and 510 of the respective trough portions 502 and 504. In some embodiments, the slope angles $\alpha_A$ and $\alpha_B$ are unequal, for example, due to anticipated differences between $\mu_A$ and $\mu_B$ and top viscosities. In some embodiments, the bottom surfaces of the trough portions 502 and 504 are sloped, for example, according to predictive models to promote equality of flow velocities at the draw line 516, or "root." In some embodiments, the brim profile of one or both trough portions is represented by a non-linear function, for example, to provide the most uniform flow front at the root of the pipe for streams A and B. In various embodiments, the geometries of the overflow distributor can be selected to form a laminated glass sheet in which the adjacent layers have unequal thicknesses. Selecting the geometries to correspond to the desired thicknesses of the layers of the laminated glass sheet can enable the sheet to be formed without rotating the overflow distributor about an axis of rotation, or without tilting the overflow distributor.

Figures 6A, 6B:
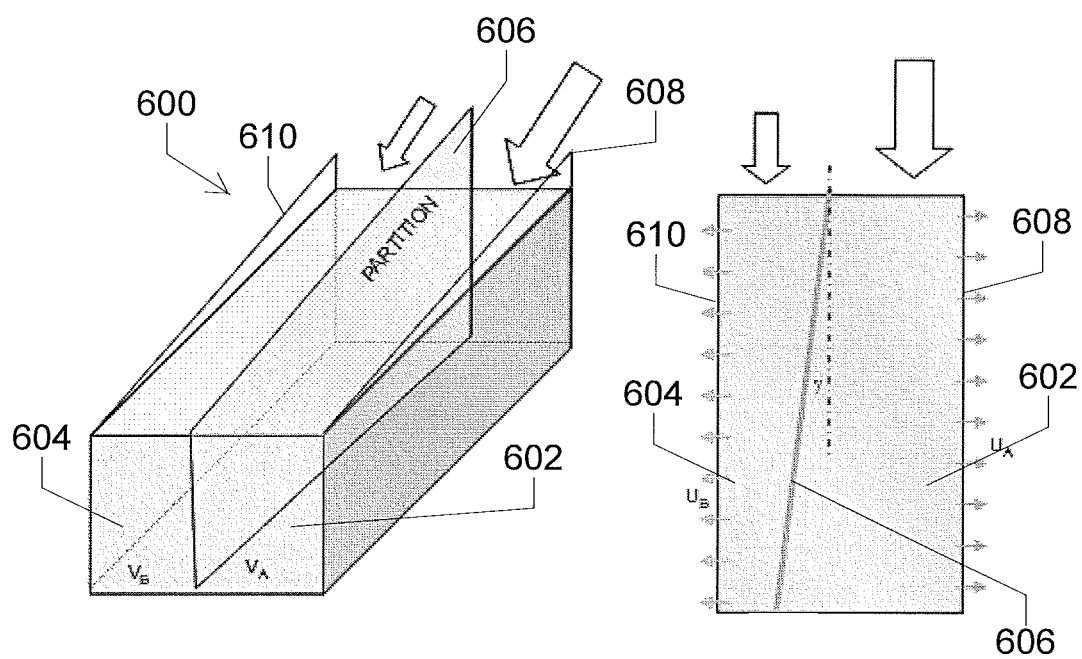
FIG. 6A is a 3-D view of one exemplary embodiment of a trough of an overflow distributor.
FIG. 6B is a top view of the trough shown in FIG. 6A.

FIGS. 6A-6B show a 3-D view and a top view, respectively, of one exemplary embodiment of a trough of an overflow distributor 600. The overflow distributor 600 is configured generally as described above with reference to the overflow distributor 400, with the additional features and/or differences described below. The trough portions 602 and 604 are partitioned and/or shaped to provide a desired relationship between the volume of the trough portion 602 $V_A$ and the volume of the trough portion 604 $V_B$. In some embodiments, the slopes of the pipe brims 608 and 610 are substantially equal (i.e., $\alpha_1=\alpha_2$), and the geometry of the partitioning wall 606 inside the trough is adjusted to provide the desired relationship. In some of such embodiments, $\alpha_1=\alpha_2$, and another angle γ (e.g., the angle between an axis of the overflow distributor 600 and the partitioning wall 606) is adjusted, for example, to promote uniform stream velocities ($U_{Atop}$ and $U_{Btop}$) along substantially the entire brim of the pipe. Both cases (i.e., (a) ($\alpha_1 \neq \alpha_2$, γ=0) and (b) ($\alpha_1=\alpha_2$, γ≠0)) can be useful because of distinctions of the glass streams A and B (e.g., due to differences in density and/or viscosity).

This disclosure proposes to draw and fuse a laminated glass article or glass composite using a vertical fusion drawing process utilizing variable geometries of the fusion pipe (e.g., as shown in FIGS. 4A-6B), dual glass delivery system, and duality of the trough cavities. In some embodiments, and in contrast to a known vertical fusion draw process, the process described herein comprises asymmetry of the flow A compared to the flow B in terms of, for example, different flow rates, flow density (thickness), and/or average flow viscosity. In some embodiments, it is advantageous to establish at the root of the fusion pipe very compatible conditions (e.g., velocity, viscosity, and/or temperature) of streams A and B while fusing the two layers. For example, in some of such embodiments, it is advantageous for a ratio of the flow velocity of stream A $v_A$ to the flow velocity of stream B $v_B$ at the root of the pipe to be near 1 to promote uniformity and dimensional stability of the laminated glass article or glass composite. In other words, if $v_A/v_B=1\pm\varepsilon$, where ε is the process induced flow rate variability error, it is advantageous to minimize ε. Additionally, or alternatively, each of streams A and B comprises a base glass composition, and one of the streams comprises a dopant added to the base glass composition to modify the optical properties of the layer formed by that stream. For example, in some embodiments, one layer of the glass article is a waveguide layer that is configured to guide light. The waveguide layer can be formed by increasing the refractive index of that layer by adding one or more refractive index raising dopants such as, for example, Ge, P, Al, Ti, or K. Additionally, or alternatively, the waveguide layer can be formed by decreasing the refractive index of the adjacent layer by adding one or more refractive index decreasing dopants such as, for example, F or B. In some embodiments, one layer of the glass article is a polarizing glass layer that is configured to polarize light. The polarizing layer can be formed by adding one or more dopants such as, for example, Ag, Cu, or Au particles. In some embodiments, glass transmission properties of a glass layer can be modified by adding one or more dopants such as, for example, a transition metal. In various embodiments, the dopant can change the optical properties without substantially changing the viscosity of the stream so that the streams A and B have the same or substantially the same viscosity, which can aid in fusing the streams to form the laminated glass article. In some embodiments, one of the first layer or the second layer comprises a base glass composition and the other of the first layer or the second layer comprises the base glass composition and a dopant in an amount sufficient to cause an optical property difference.

In some embodiments, two streams, A and B come together near the area of the pipe referred to as the root. In some of such embodiments, each stream has a different velocity as the two streams come together, and a shear layer can be formed between the two streams. The velocity of each stream as the streams approach the root area can be determined by the viscosity of each stream. The velocity of each stream depends on, for example, the cooling curve and the glass composition (e.g., the viscosity coefficient) of each stream; the flow rate of each stream; the density of each stream; and the angle between each stream and the gravity vector.

The velocity $U_s$ at the surface of each stream can be expressed using the relation based on the Navier-Stokes equation solution of a flow over an inclined plane:

$$U_s = \frac{\rho \, g \, \cos \beta}{2 \, \mu} h^2$$

where $\rho$ is the density of the stream, $\mu$ is the thru-thickness average viscosity at a given position, $\beta$ is the angle between the stream and the gravity vector and h is the thickness of the stream. The thickness h can be related to the flow rate q in each stream by the following expression:

$$h = \left[ \frac{3 \, \mu \, q}{\rho^2 \, g \, \cos \beta} \right]^{1/3}$$

As the shear layer is formed, the interaction of the streams results in a uniform velocity pattern in each stream. As long as the shear layer does not result in final velocity profiles with inflection points, the flow will be stable and uniform fusion will take place.

Finite element simulations have been carried out to obtain and inspect velocity fields for a range of flow rate ratios (up to 1:10), using different glass compositions with unequal density and viscosity coefficients. Heat fluxes of each stream were also varied to obtain different temperatures in each merging stream. Converged solutions have been obtained for all these cases.

Figure 7:
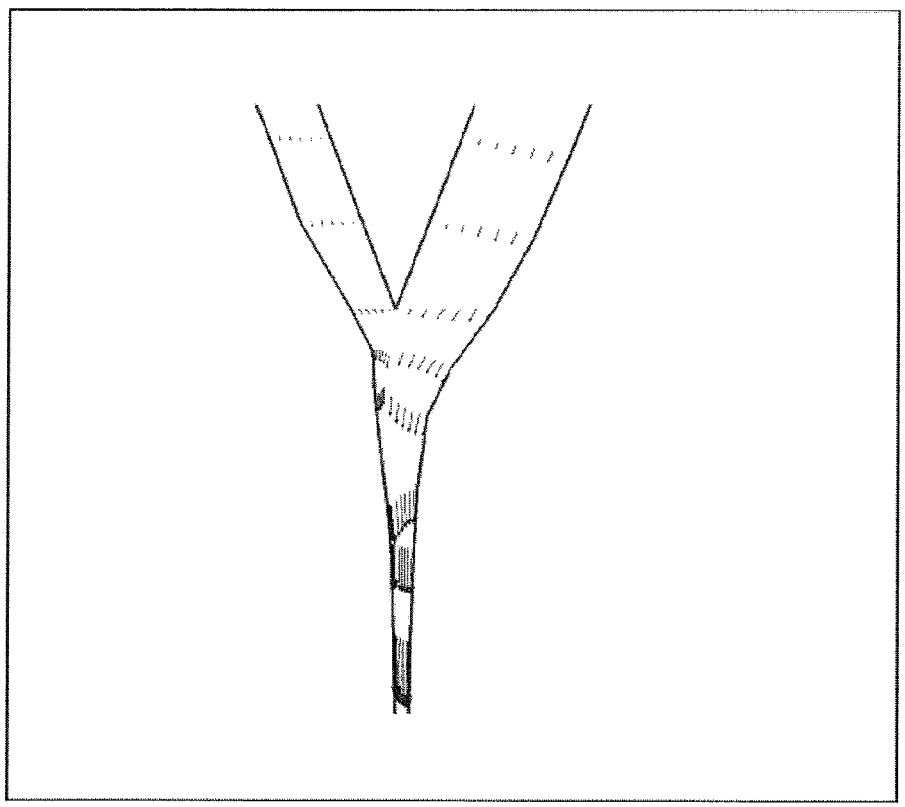
FIG. 7 is a close-up view of one exemplary embodiment of a fusion region of two streams of glass showing velocity vectors of the two streams.
Figure 8:
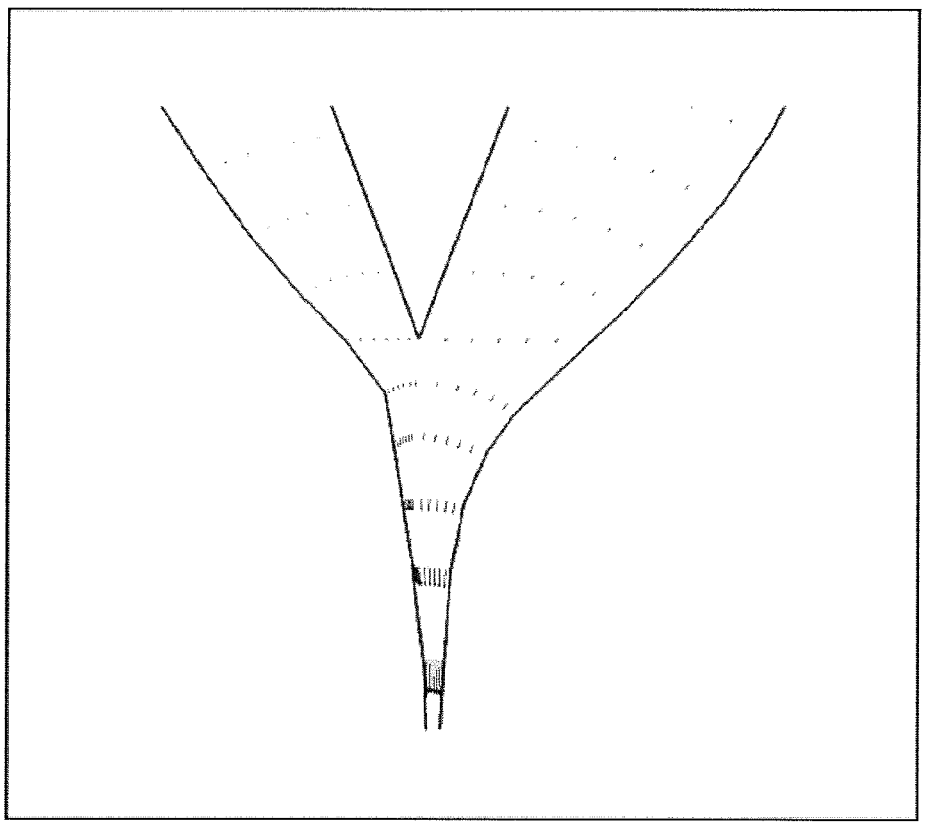
FIG. 8 is a close-up view of another exemplary embodiment of a fusion region of two streams of glass showing velocity vectors of the two streams.

FIG. 7 shows one example of a fusion region of two streams of glass showing velocity vectors of the two streams obtained from a finite element simulation in which the two streams have different densities (ratio is $\rho_1/\rho_2=1.14$), flow rates (ratio of $q_1/q_2=5$), and viscosities (ratio of $\mu_1/\mu_2=0.67$). The temperature in this simulation was taken to be constant at the two stream fusion vicinity ($T_1=T_2$). FIG. 8 shows another example of a fusion region of two streams of glass showing velocity vectors of the two streams obtained from a finite element simulation similar to that described above with reference to FIG. 7, but with varying temperature (and viscosity) in each stream (i.e., $T_1 \neq T_2$ and $\mu_1 \neq \mu_2$). In FIGS. 7 and 8, the velocity vectors of each stream are plotted to show the shearing effect and subsequent evolution to uniform velocity streaming. The viscosity ratio between the maximum and minimum of the domain is about 30, the maximum viscosity being close to 1 million poise.

In some embodiments, the laminated glass articles described herein can be configured as laminated glass sheets that are substantially planar (i.e., flat) or non-planar (i.e., curved) and substantially rigid or flexible. The laminated glass articles described herein can be useful in a variety of display technologies and specialty environmental glass applications. To that end, the laminated glass articles can be useful as glass substrates that exhibit multiple functionalities. For example, the glass substrates can exhibit one or more primary functionalities, such as high transmissivity, filtering unwanted radiation, pristine surface, very uniform thickness, high degree flatness, very low residual stresses, chemical neutrality, or dimensional stability, as well as one or more secondary functionalities, such as 2-D linear/circular polarization or light guiding/uniform dispersion (e.g., due to the TIR principle). Thus, the laminated glass article comprises an optical property difference between the first layer and the second layer. For example, the optical property difference comprises at least one of: (a) a refractive index difference between a refractive index $n_1$ of the first layer and a refractive index $n_2$ of the second layer of at least 0.005; or (b) a transmission profile difference between a transmission profile of the first layer and a transmission profile of the second layer in a wavelength range from 200 nm to 2500 nm; or (c) a light-polarizing difference, whereby the second layer is light-polarizing with respect electromagnetic irradiation in the wavelength range from 200 nm to 2500 nm. Such secondary functionalities can be optical functions that are advantageous for substrates for display technologies.

In embodiments comprising such secondary optical functionality, a glass substrate (e.g., a two-layer laminated glass article or glass composite) comprises a primary substrate layer (A-layer) and a secondary functional layer (B-layer) that can provide the desired secondary optical function(s). Both layers are fused to maintain strict geometrical and mechanical properties such as, for example, thickness uniformity, low level of interlaminar shear stresses, and high degree of flatness. In some embodiments, the B-layer is very uniform in terms of thickness, which can aid in maintaining viable optical functionality throughout the laminated glass article (e.g. by providing a lack of discontinuities or an air-gap free adherence to the A-layer).

In some embodiments, each layer of the laminated glass article has a thickness of at least 10 µm, at least 25 µm, at least 50 µm, at least 100 µm, at least 200 µm, at least 300 µm, at least 400 µm, at least 500 µm, at least 600 µm, at least 700 µm, at least 800 µm, at least 900 µm, at least 1000 µm, at least 1100 µm, at least 1200 µm, at least 1300 µm, at least 1400 µm, or at least 1500 µm. Additionally, or alternatively, in some embodiments, each layer of the laminated glass article has a thickness of at most 1600 µm, at most 1400 µm, at most 1300 µm, at most 1200 µm, at most 1100 µm, at most 1000 µm, at most 900 µm, at most 800 µm, at most 700 µm, or at most 600 µm. In some embodiments, the A-layer has a thickness of 50-700 µm, 100-700 µm, 150-700 µm, 200-700 µm, or 250-700 µm. Additionally, or alternatively, in some embodiments, the B-layer has a uniform thickness of about 10-150 µm, which can be useful for use as a 2-D light guide.

In some embodiments, the thickness ratio of the laminated glass article (i.e., the ratio of the thickness of the A-layer $h_A$ to the thickness of the B-layer $h_B$) is in a range of about $70 \geq h_A/h_B \geq 0.3$, about $70 \geq h_A/h_B \geq 0.6$, about $70 \geq h_A/h_B \geq 1$, about $70 \geq h_A/h_B \geq 1.3$, about $28 \geq h_A/h_B \geq 1.6$, or about $24 \geq h_A/h_B \geq 2$. In some of such embodiments, the laminated glass article comprises an AMLCD substrate. In some embodiments, $h_A/h_B \geq 1$, $h_A/h_B \geq 1.2$, $h_A/h_B \geq 1.2$, $h_A/h_B \geq 1.4$, $h_A/h_B \geq 1.5$, $h_A/h_B \geq 1.6$, $h_A/h_B \geq 1.8$, $h_A/h_B \geq 2$, $h_A/h_B \geq 2.2$, or $h_A/h_B \geq 2.5$.

In some embodiments, the thickness ratio of the laminated glass article (i.e., the ratio of the thickness of the A-layer $h_A$ to the thickness of the B-layer $h_B$) is at least about 0.3, at least about 0.6, at least about 1, at least about 1.1, at least about 1.2, at least about 1.3, at least about 1.4, at least about 1.5, at least about 1.6, at least about 1.8, at least about 2, at least about 2.2, at least about 2.5, at least about 5, at least about 10, at least about 20, at least about 30, at least about 40, at least about 50, or at least about 60. Additionally, or alternatively, the thickness ratio of the laminated glass article is at most about 70, at most about 60, at most about 50, at most about 40, at most about 30, at most about 28, at most about 25, or at most about 24. In some embodiments, the laminated glass article comprises an AMLCD substrate.

In some embodiments, the laminated glass article has three dimensions: length (L), width (W) and thickness (T). The length is the largest dimension, and the thickness is the smallest dimension. In some of such embodiments, $T \geq 50$ µm, $T \geq 100$ µm, $T \geq 200$ µm, $T \geq 300$ µm, $T \geq 400$ µm, or $T \geq 500$ µm. Additionally, or alternatively, $T \leq 1000$ µm, $T \leq 900$ µm, $T \leq 800$ µm, $T \leq 700$ µm, $T \leq 600$ µm, or $T \leq 500$ µm. Additionally, or alternatively, $L/T \geq 300$, $L/T \geq 500$, $L/T \geq 800$, $L/T \geq 1000$, $L/T \geq 1500$, $L/T \geq 1800$, or $L/T \geq 2000$.

In some embodiments, a method comprises fusing two glass layers in a viscous (i.e., fluid) state together to form a laminated glass article. Laminated glass articles formed using such methods are distinct from known laminate compositions, which are generally made via lamination (i.e. mechanically and/or thermally bonding a layer of polymer or other optical film onto a glass substrate), or by sputtering a liquid optical film (e.g., a polymer) onto a substrate. For example, such known laminate compositions tend to lack the mechanical and thermal integrity desired for high temperature lithography processes. The process described herein can be used to overcome the thermal and mechanical instability of known composites.

In some embodiments in which two layers in the laminated glass article are sufficient to provide the secondary optical functions, the laminated glass article comprises a two-layer substrate, as opposed to a substrate having three or more layers. In some of such embodiments, the laminated glass article or glass composite comprises a display substrate (e.g., an AMLCD substrate) that provides multiple optical and mechanical functions simultaneously. Mechanically, such a display substrate can maintain precisely the thickness specifications of individual layers over the entire area and exhibit a high level of mechanical integrity. In some embodiments, the laminated glass article can be used in high temperature thin-film transistor (TFT) lithography, such as in the process of manufacturing AMLCD panels. In some embodiments, the new optical functionality of the laminated glass article described herein enables production of a smart substrate to deliver display enhancing functions such as, for example, contrast enhancement, lower power consumption, and/or recycling of the backlight through techniques widely implemented in liquid crystal display (LCD) TV/monitor assembly processes.

In known AMLCD substrates, several optical enhancing functions (e.g., uniform light diffusion and recycling of the polarized light) are conducted outside of known LCD panels by a variety of polymer based filters. The AMLCD substrate can be "smartened" as described herein to provide one or more of the secondary optical functions within the volume of the substrate itself, instead of building and inserting separate filters inside the LCD monitors/TV sets. In some embodiments, to smarten the LCD substrates and provide the secondary optical function(s), precision glass composites can be manufactured to satisfy the desired properties of original LCD substrate in terms of high thermal dimensional stability, pristine surface, and very uniform thickness distribution. For example, in some embodiments, the secondary optical functions comprise an index of refraction-mismatched secondary layer of precision drawn glass. In some of such embodiments, the index of refraction of the primary substrate layer and the index of refraction of the secondary functional layer differ by at least about 0.005, at least about 0.01, at least about 0.02, at least about 0.05, at least about 0.1, at least about 0.2, at least about 0.3, or at least about 0.4. In some embodiments, the secondary layer has a uniform thickness in a range of about 10-150 µm. This thickness range may enable light guiding capability without losses, for example, through the TIR principle.

In some embodiments, a new manufacturing method comprises fusing a laminated glass article or precision glass composite that can be used as an AMLCD substrate having one or more secondary optical functions. The process described herein addresses the issue of fusing at a root level two streams of glass (e.g., A and B) by asymmetric geometries of troughs A and B to enable uniform flow distribution on the brims of the pipe, which is different from a process that incorporates two individual fusion pipe systems to create a three layer (e.g., B-A-B) glass laminate. The individual troughs are fed by separate glass feeding systems. In some embodiments, the apparatus for the process comprises an asymmetric cross-section of the pipe to compensate for different viscosities of two glass compositions, for example, to promote equality of the stream flows A and B at the root of the pipe. FEA/CFD simulated analysis has shown that two inhomogeneous streams can deliver a converging solution and be fused uniformly, i.e. with substantially similar or the same stream velocity at the root level, within a wide range of variable thicknesses at the root level.

In some embodiments, the laminated glass article provides primary substrate function and secondary optical functions. To that end, the thin layer (e.g., the B-layer) is optically continuous (i.e., substantially free of cracks or discontinuities). In some of such embodiments, the B-layer is under slight compression.

In some embodiments, the process described herein is distinct from known vertical fusion draw processes and enables manufacturability of a family of precision glass composite substrates with built-in multi-optical functionality.

Application areas for the laminated glass articles described herein include, for example: (i) AMLCD glass substrate with dual optical functionality (e.g., as glass substrate for a TFT layer and as a light diffuser, the latter substituted by linear/circular polarized function); (ii) safety glass with dual optical functionality (e.g., as a glass substrate with a high degree of transmissivity, and as a band-pass filter to cut-off/reduce radiation in unwanted regions of the electromagnetic spectrum, such as UV (150-350 nm), short/mid IR (0.75-10 µm), or any other electromagnetic band); (iii) environmental glass with dual functionality such as architectural glass, auto glass and other applications (e.g., as a glass substrate with a high transmissivity, and as a band-pass filter to cut-off UV and/or IR radiation).

In some examples, dual optical functionality, such as in an AMLCD substrate, provides a significant form factor advantage over a separate glass substrate built into the panel and separate light diffuser filter (e.g., as provided in known products by thin extruded polymer). The 2-layer precision glass laminate articles describe herein, as a product of the 2-component vertical fusion draw process described herein, create new distinguishing features as a display substrate and extends into future flexible displays where mechanical integration of a TFT substrate with display enhancing filter functions will be even more advantageous.

It will be apparent to those skilled in the art that various modifications and variations can be made without departing from the spirit or scope of the invention. Accordingly, the invention is not to be restricted except in light of the attached claims and their equivalents.

What is claimed is:

1. A laminated glass article comprising at least a first layer, a second layer fused to the first layer, and an optical property difference between the first layer and the second layer,
   wherein the first layer comprises a first glass composition, and the second layer comprises a second glass composition, and
   wherein the optical property difference comprises at least one of:
   (a) a transmission profile difference between a transmission profile of the first layer and a transmission profile of the second layer in a wavelength range from 200 nm to 2500 nm; or
   (b) a light-polarizing difference, whereby the second layer is light-polarizing with respect to electromagnetic irradiation in the wavelength range from 200 nm to 2500 nm; or
   (c) a refractive index difference between a refractive index $n_1$ of the first layer and a refractive index $n_2$ of the second layer of at least 0.005, wherein one of the first layer or the second layer comprises a base glass composition and the other of the first layer or the second layer comprises the base glass composition and a dopant in an amount sufficient to cause the refractive index difference.

2. A laminated glass article according to claim 1, wherein each layer in the glass article has a thickness of at least 10 µm and at most 1600 µm.

3. A laminated glass article according to claim 1, wherein the first layer comprises a thickness of from 50 µm to 700 µm, and the second layer comprises a thickness of from 10 µm to 150 µm.

4. A laminated glass article according to claim 1, wherein a ratio of the thickness of the first layer to the thickness of the second layer is from 0.3 to 70.

5. A laminated glass article according to claim 1, wherein one of the first layer or the second layer comprises a base glass composition and the other of the first layer or the second layer comprises the base glass composition and a dopant in an amount sufficient to cause the optical property difference.

6. A laminated glass article according to claim 1, wherein the optical property difference comprises the refractive index difference.

7. A laminated glass article according to claim 1, wherein:
   the optical property difference comprises the transmission profile difference;
   the first layer comprises a band-pass filter, a notch filter, or a transparent layer; and
   the second layer comprises a band-pass filter or a notch filter.

8. A laminated glass article according to claim 1, wherein:
   the optical property difference comprises the light-polarizing difference;
   the second layer is an outermost layer; and
   the first layer is non-light-polarizing with respect to electromagnetic irradiation in the wavelength range of 200 nm to 2500 nm.

9. A laminated glass article according to claim 1, further comprising three dimensions: length (L), width (W) and thickness (T), the length being the largest dimension and the thickness being the smallest dimension, wherein L/T≥300 and T≥50 µm.

10. A laminated glass article according to claim 1, wherein at least one of the first layer or the second layer comprises multiple inclusions having a refractive index different than a refractive index of the respective first layer or second layer, whereby light traveling through the respective first layer or second layer is scattered by the inclusions.

11. A laminated glass article according claim 1, wherein an interface of the first layer and the second layer is uneven such that light traveling through one layer is reflected at the interface in multiple directions.

12. A laminated glass article according to claim 1, wherein at least one of the first layer or the second layer comprises a Bragg grating.

13. An optical device comprising a laminated glass article according to claim 1 and a plurality of semiconductor devices disposed on at least one major external surface of the laminated glass article.

14. An optical device according to claim 13, wherein at least part of the plurality of semiconductor devices is formed by employing a step wherein the laminated glass article is subjected to a temperature higher than 400° C.

15. An optical device according to claim 13, wherein an illumination source is coupled to an edge of at least one of the first layer or the second layer of the laminated glass article, such that light from the illumination source travels through the at least one of the first layer or the second layer.

16. An optical device according to claim 15, wherein the at least one of the first layer or the second layer is an external layer, and an external surface of the external layer comprises a reflective surface.

17. An optical device according to claim 15, wherein at least part of the light traveling in the at least one of the first layer or the second layer is subject to total internal reflection when reflected at the interface of an external surface of the at least one of the first layer or the second layer and an outside medium.

18. An optical device according to claim 13, wherein the optical device comprises at least one of an LCD display, a photovoltaic device, an optical filter, a flexible display, or a curved display.

* * * * *

UNITED STATES PATENT AND TRADEMARK OFFICE
CERTIFICATE OF CORRECTION

Page 1 of 1

PATENT NO. : 10,661,533 B2
APPLICATION NO. : 15/036312
DATED : May 26, 2020
INVENTOR(S) : Olus Naili Boratav et al.

It is certified that error appears in the above-identified patent and that said Letters Patent is hereby corrected as shown below:

On the Title Page

On page 2, in Column 2, item (56), Other Publications, Line 13, delete "Appliaction" and insert -- Application --, therefor.

In the Claims

In Column 12, Line 32, Claim 11, delete "according" and insert -- according to --, therefor.

Signed and Sealed this
Twelfth Day of January, 2021

Andrei Iancu
*Director of the United States Patent and Trademark Office*